Jan. 22, 1929.

W. H. MOORE 1,699,905

VALVE LOCK

Filed April 19, 1928

Inventor
W. H. Moore,

By Clarence A. O'Brien
Attorney

Patented Jan. 22, 1929.

1,699,905

UNITED STATES PATENT OFFICE.

WALTER H. MOORE, OF SANTA BARBARA, CALIFORNIA.

VALVE LOCK.

Application filed April 19, 1928. Serial No. 271,234.

The present invention relates to improvements in valve locks and has for its principal object to provide a simple and efficient means for locking the valve in a closed or shut off position so that unauthorized persons cannot purloin the liquid which flows through the pipe to which the valve is attached.

Another important object of the invention resides in the provision of a valve lock which includes a key operated sliding bolt that cooperates with the opening formed in the rotatable plug of the valve for locking said plug in a shut off or closed position.

The plug is free to rotate, so that the same may be moved to an open position when the proper key is inserted and the locking bolt is retracted.

A still further object of the invention is to provide a valve lock of the above mentioned character which is simple in construction, inexpensive, strong and durable, and further well adapted to the purpose for which it is designed.

Other objects of the invention will become apparent as the nature of the invention proceeds and when taken in connection with the accompanying drawing.

In the accompanying drawing, forming a part of this application and in which like numerals designate like parts throughout the several views.

Figure 1:
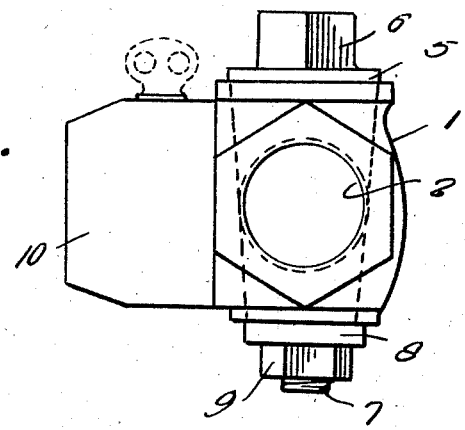
Figure 1 is a side elevation of the lock valve embodying my invention.
Figure 2:
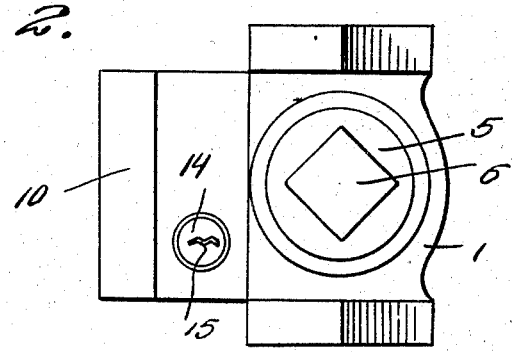
Figure 2 is a top plan view thereof.

In the drawing, wherein for the purpose of illustration is shown the preferred embodiment of my invention, the numeral 1 designates generally a valve body that is formed with the inlet and outlet openings 2 and 3, at the respective ends thereof for connection with the supply pipe at one end and a discharge pipe at the other, in the manner well known in the art.

The central portion of the valve body is formed with a vertically disposed tapered seat 4, in which is arranged the rotatable plug 5. This plug is provided with the usual square portion 6 at its upper end for disposition above the valve body, a threaded stem 7 being formed on the lower end of the tapered plug that projects through the bottom of the valve body and the usual washers and nuts 8 and 9 respectively are arranged on the threaded stem, as shown in Figure 1. The plug 5 is furthermore formed with the usual vertical slot or opening 10, that is adapted to communicate with the inlet and outlets 2 and 3 respectively, when the plug is in one position to permit the liquid to flow through the valve body, and when the plug is disposed in the position shown in Figure 3, the opening 10 is out of registration with the inlet and outlet openings of the valve.

Cast on the rear side of the valve body 1 is the lock casing 11, the same being formed with a transverse intermediate slot 11, that communicates with a similar slot 12 formed in the rear side of the valve body and which slot extends into the seat 4 provided for the rotatable plug 5.

Figure 3:
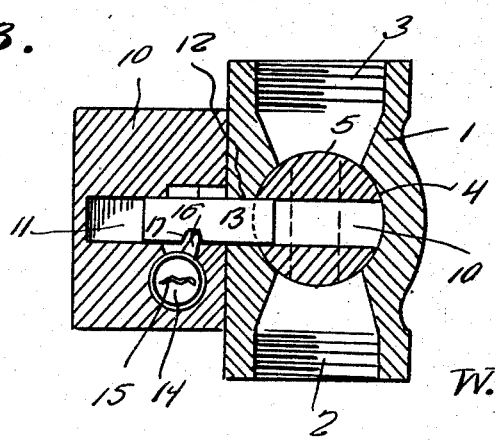
Figure 3 is a horizontal section through the valve locks showing the manner in which the slidable bolt engages with the opening in the rotatable plug for locking the same in a closed or shut off position.

Slidable in the slot 11 is the locking bolt 13, and for the purpose of actuating this bolt there is arranged in the lock casing a cylinder or barrel 14 provided with the key receiving slot 15 to rotate the same, and a lug 16 extends radially from this barrel into a notch 17 formed in one side of the bolt as clearly shown in Figure 3.

When the parts are arranged as shown in Figure 3, it will be observed that the inner end of the bolt 13 extends into the opening 10, formed in the plug 5, whereby said plug is locked in a closed or shut off position so that an unauthorized person cannot actuate the plug to obtain any liquid from a tank or pipe with which the valve is associated.

By the insertion of the proper key in the slot 15, the barrel 14 may be actuated so as to cause the lugs 16 to cooperate with the notch 17 to retract the slidable bolt 13, for disposition within the cavity 11 provided therefor in the lock casing 10, whereby the inner end of the locking bolt will be moved out of engagement with the opening in the plug 5 and the plug may then be rotated in the usual manner to register the opening 11 with the inlet and outlet ports of the valve.

It will thus be seen from the foregoing description that I have provided a valve lock which will not necessitate the alteration of the rotatable plug of the valve in any manner and due to its simplicity, the valve lock can be constructed at a very low cost and the same will, at all times, be positive and efficient in carrying out the purposes for which it is designed.

While I have shown the preferred embodiment of my invention, it is to be understood that minor changes in the size, shape and arrangement of parts may be resorted to, without departing from the spirit of the invention and the scope of the appended claim.

Having thus described my invention, what I claim as new is:

In a valve lock, a valve body provided with an inlet and an outlet, a rotatable plug mounted in the valve body between said inlet and outlet and provided with an opening adapted to communicate with the inlet and outlet when the plug is in one position, and means for locking the plug in a closed position, said means comprising a slidable bolt arranged at the side of the valve body, the inner end of said bolt adapted to enter the opening in the plug when said opening is disposed at right angles with respect to the inlet and outlet of the valve body.

In testimony whereof I affix my signature.

WALTER H. MOORE.